United States Patent
Womack

(12) 
(10) Patent No.: US 6,305,886 B1
(45) Date of Patent: Oct. 23, 2001

(54) DRILL GUIDE FIXTURE FOR DRILLING, TO OPEN, DISC PADLOCKS, RECTANGULAR PADLOCKS, DOOR KNOBS AND LEVER LOCKS

(76) Inventor: Robert C. Womack, 2010 Shea, Dallas, TX (US) 75235

( * ) Notice: Subject to any disclaimer, the term of this patent is extended or adjusted under 35 U.S.C. 154(b) by 0 days.

(21) Appl. No.: 09/607,286

(22) Filed: Jun. 30, 2000

(51) Int. Cl.$^7$ ................................................. B23B 49/00
(52) U.S. Cl. ...................................... 408/103; 408/115 R
(58) Field of Search ............................ 408/72 R, 115 R, 408/104, 105, 108, 103, 72 B, 115 B

(56) References Cited

U.S. PATENT DOCUMENTS

| | | | |
|---|---|---|---|
| 2,602,238 | * 7/1952 | Wellman | 408/115 R |
| 2,619,730 | * 12/1952 | Carter | 408/115 R |
| 2,804,788 | * 9/1957 | Humphrey | 408/115 R |
| 2,843,167 | * 7/1958 | Rushton | 408/115 R |
| 2,928,441 | * 3/1960 | Farrow | 279/115 R |
| 3,062,076 | * 11/1962 | Craig | 408/115 R |
| 4,153,384 | * 5/1979 | Isaken | 408/115 R |
| 4,194,861 | * 3/1980 | Keller | 408/115 R |
| 4,461,603 | * 7/1984 | Klee et al. | 408/115 R |
| 5,713,225 | 2/1998 | Smith . | |

FOREIGN PATENT DOCUMENTS

| 1553278 | * 3/1990 | (SU) | 408/115 R |
|---|---|---|---|

* cited by examiner

Primary Examiner—Daniel W. Howell
Assistant Examiner—Terrence Washington
(74) Attorney, Agent, or Firm—Mark W. Handley

(57) ABSTRACT

A drill guide fixture (12) and method are provided for drilling door locks and padlocks of various configurations and sizes. The drill guide fixture (12) has a guide jaw (16), a latch jaw (18) and a guide arm (20), which are secured together with a latch bolt (22) and a guide bolt (24). The guide arm (20) is of an elongated shape having a longitudinally extending slot in a central portion thereof for securing with the guide bolt (24) to one of the guide jaw (16) and the latch jaw (18). The guide jaw (16) and the latch jaw (18) each have a v-shaped notch (72, 74), in each of which scalloped-shaped recesses (76, 78, 80, 82) are formed to aid in clamping the guide and latch jaws (16, 18) to door knobs and round shaped locks. A drill guide hole (54) is formed through the guide arm (20), spaced apart from the longitudinally extending slot (66), for aligning with a cylinder (50) and guiding a drill (56) into the tumbler pins (192) of the cylinder (50). Some padlocks (132) have a screw (140) holding a cylinder (138) to the padlock body (136), such that the screw (140) may be drilled to release the cylinder (138) so that it may be removed from within the padlock body (136) for re-keying rather than drilling out the tumbler pins. For such padlocks (132), a second drill guide hole (52) extends through the guide jaw (16) for guiding a drill (84) into the body (136) of the padlock (132) to sever the screw (140) holding the cylinder (138) to the padlock body (136). The drill hole (148) formed into the body (136) may be sealed by threading the drill hole (148), installing a screw (158), and then removing the head (160) from the screw (158).

20 Claims, 8 Drawing Sheets

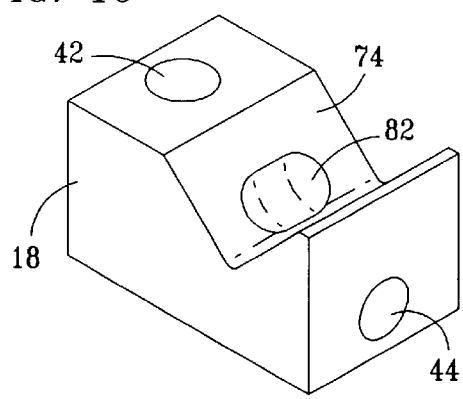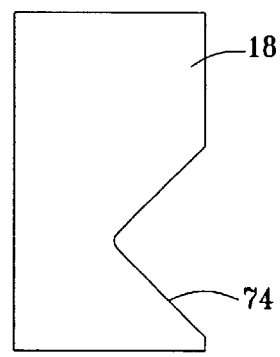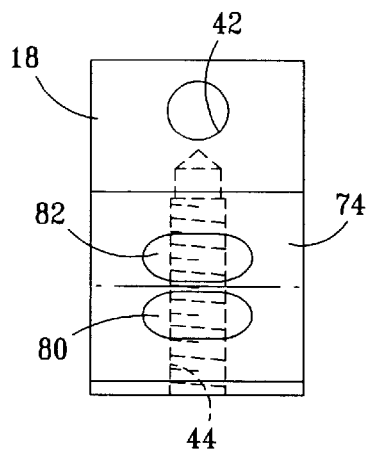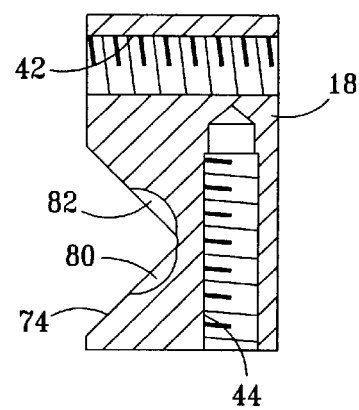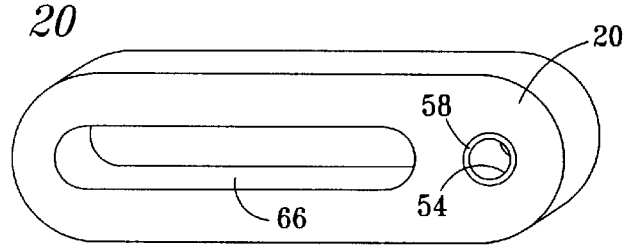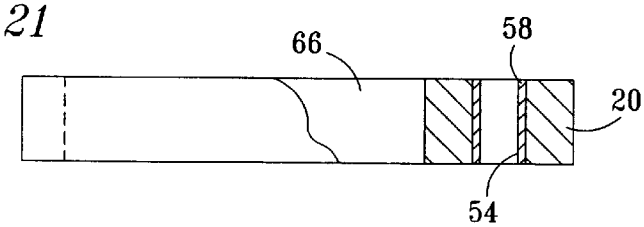

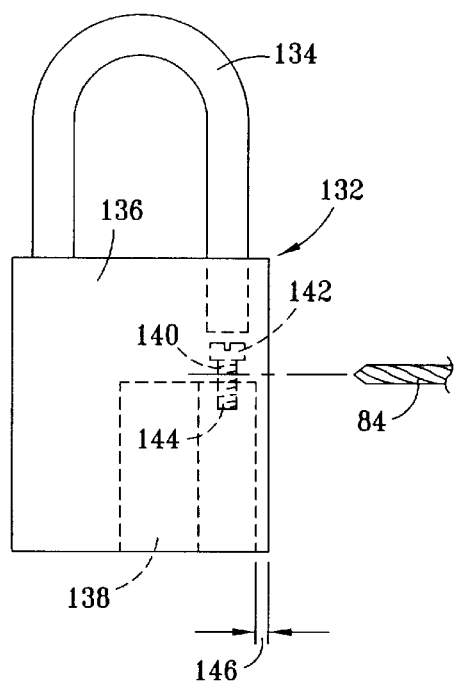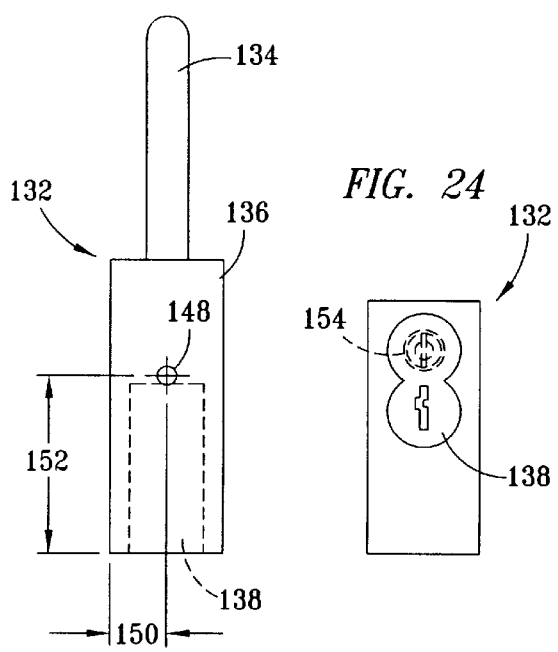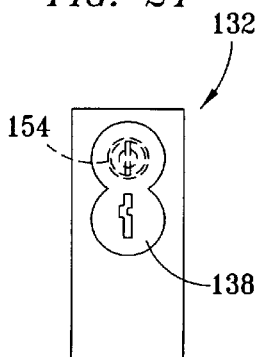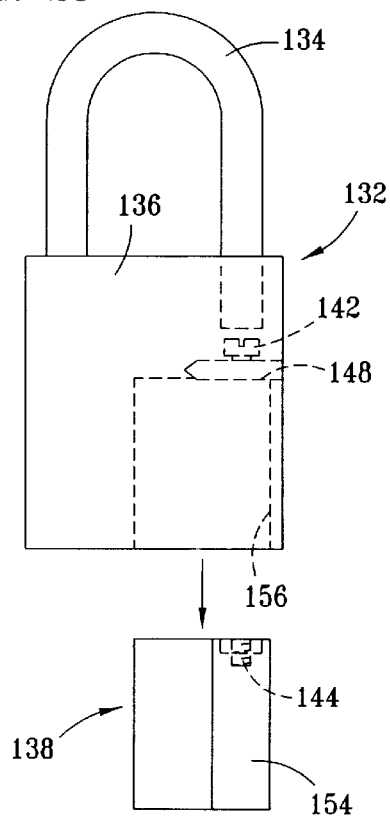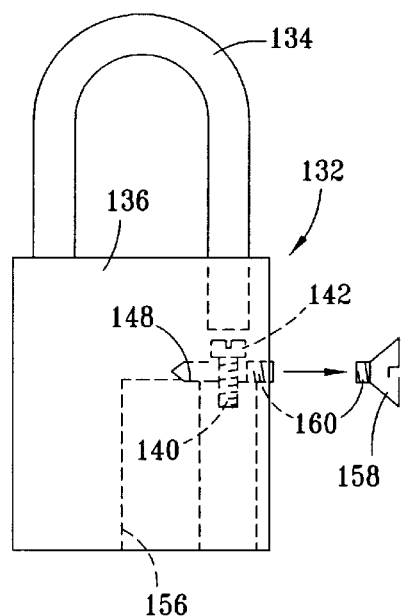

DRILL GUIDE FIXTURE FOR DRILLING, TO OPEN, DISC PADLOCKS, RECTANGULAR PADLOCKS, DOOR KNOBS AND LEVER LOCKS

TECHNICAL FIELD OF THE INVENTION

This invention is related in general to door locks and padlocks, and in particular to a fixture and methods for opening locks and for removing lock cylinders from door locks and padlocks.

BACKGROUND OF THE INVENTION

The owners and operators of storage building units, apartments, boat houses and the like, often have renters who fail to remove padlocks and take door lock keys when leases are terminated. Frequently, the owners of such units are required to remove door locks and padlocks without use of a key so that new tenants may use such units. Typically, either the shackles on such locks are cut, the tumbler pins are drilled from cylinders in the locks, or cylinder retaining fasteners are drilled to release the cylinders from the bodies of the locks. In some cases, the lock cylinders may be replaced and the locks reused, provided that the cylinders are the re-keyable type and the locks are carefully drilled. However, carefull drilling of the locks is often difficult since the locks are typically made of hard materials, such as hardened steel or alloys of special hardness, to make it difficult to drill the tumbler pins from the locks. Some fixturing has been suggested to aid in placement of the drill for drilling the tumblers for opening locks or removing the cylinders from such locks. Locks are typically drilled without fixturing, which often causes damage to the locks and breaks drills due to the difficulty of maintaining the drills in stationary positions while drilling.

SUMMARY OF THE INVENTION

A drill guide fixture and method of using the drill guide fixture are provided for guiding a drill into door locks and padlocks of various configurations and sizes. The drill guide fixture has a guide jaw, a latch jaw and a guide arm, which are secured together with a latch bolt and a guide bolt. The guide jaw and the latch jaw are fastened to together with the latch bolt on opposite sides of a lock to clamp the drill guide fixture to the lock. Preferably, several lengths of latch bolts are provided to accommodate locks of various sizes. The guide arm is of an elongated shape having a longitudinally extending slot in a central portion thereof for securing with the guide bolt to the guide jaw and the latch jaw. The guide jaw and the latch jaw have v-shaped notches within each of which scalloped-shaped recesses are formed to aid in clamping the guide jaw and the latch jaw of the drill guide fixture to round bodied door knobs and round padlocks. A drill guide hole is formed through the guide arm and spaced apart from the longitudinally extending slot for aligning with the shear line of a lock cylinder for guiding a drill into the tumbler pins of the cylinder. Some padlocks have a screw which fastens cylinders to the padlock bodies. These screws may be drilled to release the cylinders such that they may be removed from within the bodies of the padlocks for re-keying. For such padlocks, a second drill guide hole through the guide jaw is used to guide a drill into the body of the lock and sever the screw holding the cylinder in the padlock body. Then, the drill hole in the padlock body may be sealed by threading the drill hole, installing a screw, and lastly removing the head from the screw and polishing the cut end of the screw flat.

BRIEF DESCRIPTION OF THE DRAWINGS

For a more complete understanding of the present invention and the advantages thereof, reference is now made to the following description taken in conjunction with the accompanying Drawings in which:

FIG. 16 is a perspective view of a latch jaw;

FIG. 17 is a left side view of the latch jaw;

FIG. 18 is a top view of the latch jaw;

FIG. 19 is a sectional view of the latch jaw;

FIG. 20 is a perspective view of a guide arm;

FIG. 21 is a cutaway view of the guide arm;

FIGS. 22 through 26 are various views of a padlock having a lock cylinder which is secured in the body of the lock with a screw;

DETAILED DESCRIPTION OF THE INVENTION

Figure 1:
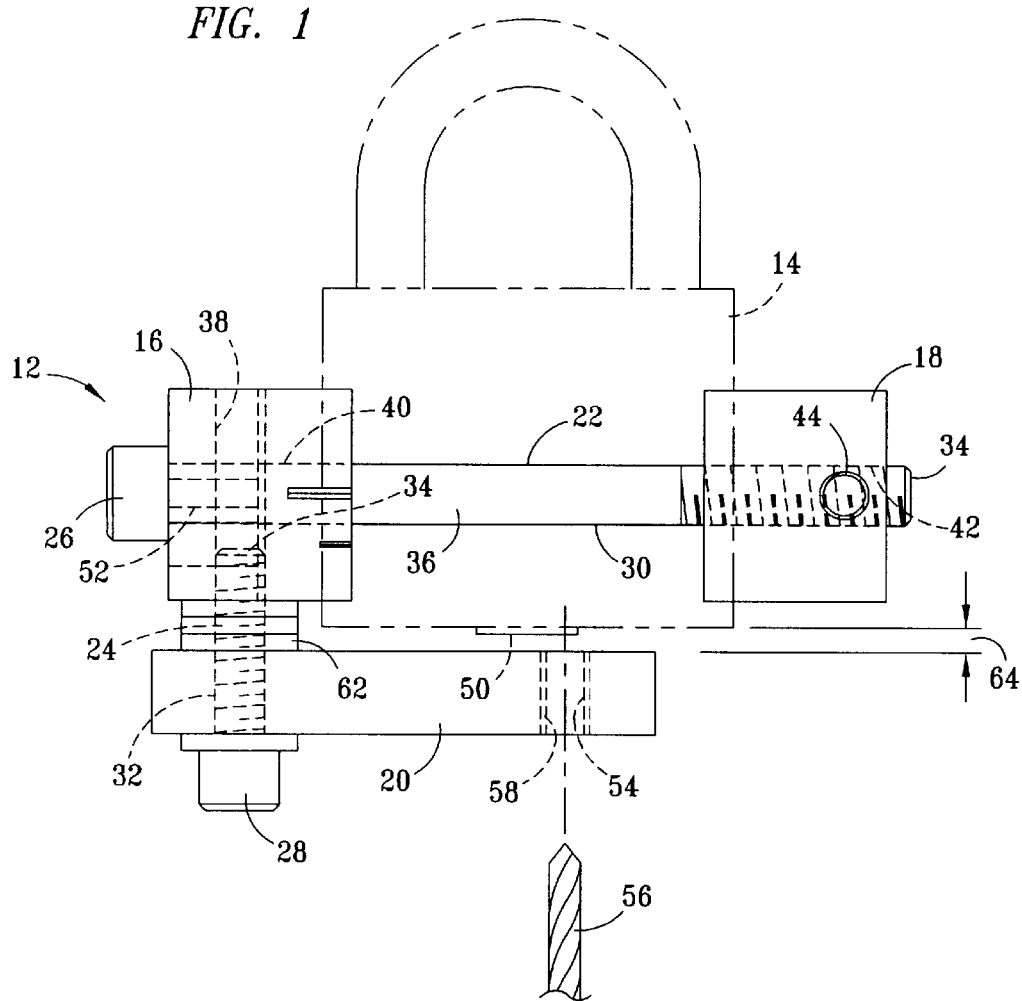
FIG. 1 is a side elevation view of a drill guide fixture mounted to a rectangular padlock.

FIG. 1 is a side elevation view of a drill guide fixture 12 mounted to a padlock 14 (shown in phantom). The drill guide fixture 12 has a guide jaw 16, a latch jaw 18 and a guide arm 20. The guide jaw 16 is secured to the latch jaw 18 by a latch bolt 22. The guide arm 20 is secured to the guide jaw 16 by a guide bolt 24. The latch bolt 22 and the guide bolt 24 have heads 26 and 28, respectively and shanks 30 and 32, respectively, with threaded ends 34. A central portion of the shank 36 of the latch bolt 22 is smooth, that is, it is not threaded. The guide jaw 16 has a threaded bore 38 and a smooth bore 40. The latch jaw 18 has a threaded bore 42 and a threaded bore 44. The threaded bores 38, 42 and 44 are used for securing to the threaded ends of various ones of the latch bolt 22 and the guide bolt 24, with different ones of the bores 38, 42 and 44 being used for reconfiguring the drill guide fixture 12 for use on locks of various shapes and sizes. Preferably, the latch bolt 22 is provided in three different lengths, one being three inches long, another being four inches long and another being five inches long, for fitting locks of different sizes. The guide bolt 24 is preferably one and one-quarter inches long.

The smooth bore 40 is sized for passing the threaded end 34 and the smooth portion of the shank 36 of the latch bolt 22. A drill guide hole 52 extends through the guide jaw 16, and a drill guide hole 54 extends through the guide arm 20. When the drill guide fixture 12 is configured as shown, an edge of a plug of the cylinder 50 in the bottom of the padlock 14 is aligned with the drill guide hole 54. A drill 56 is passed through the guide hole 54 for drilling a tumbler section of the cylinder 50. Two hardened metal sleeves provide a bushing 58 in the guide hole 54 and a bushing 60 in the guide hole 52. Preferably, the bushing 58 is sized for receiving a three-sixteenth inch drill bit 56, and the bushing 60 is sized for receiving a No. 29 size drill 84, for use with an 8–32 tap. Washers 62 provide spacers which are disposed between the guide jaw 16 and the guide arm 20 to provide a space or gap 64 between the cylinder 50 and the guide arm 20. The gap 64 provides a region for drill cuttings and like debris to exit the cylinder 50. The gap 64 is preferably one-sixteenth inch to three thirty-seconds of an inch wide. The user may choose to eliminate the washers 62 and position the lock 14 one-sixteenth inch deep into the guide jaw 16 and the latch jaw 18.

Figure 2:
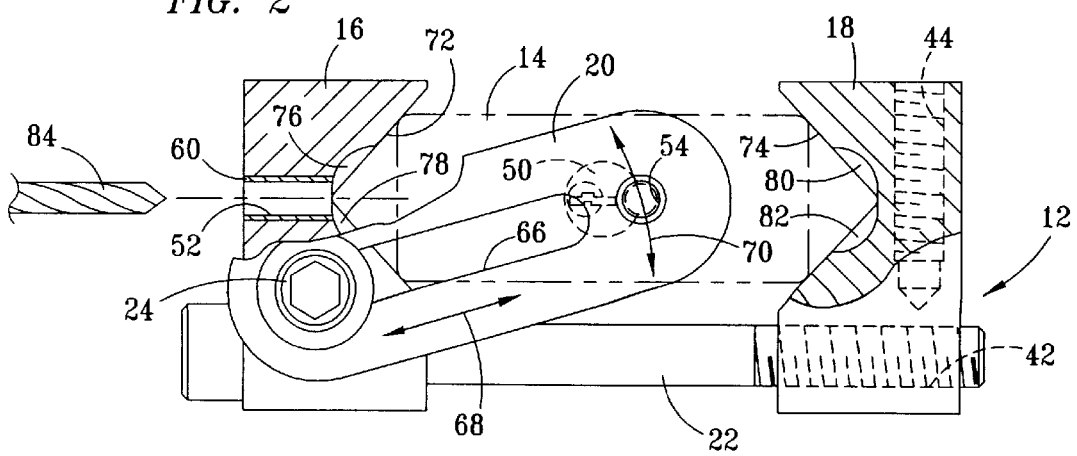
FIG. 2 is a cutaway view of the drill guide fixture mounted to the padlock.

FIG. 2 is a cutaway view of the drill guide fixture 12 after being mounted to the padlock 14. The guide arm 20 has a slot 66 extending longitudinally therein for receipt of the guide bolt 24, such that the drill guide hole 54 is moveable in the lineal direction 68 and may be angularly displaced in the angular direction 70. The v-shaped notch, 72 extends into the guide jaw 16 and the v-shaped notch 74 extends into the latch jaw 18. Scalloped-shaped recesses 76 and 78 extend into the surface of the v-shaped notch 72, and scalloped-shaped recesses 80 and 82 extend into the surface of the v-shaped notch 74 for aiding in clamping the guide jaw 16 and the latch jaw 18 to round surfaces. The notches 72, 74 and recesses 76, 78, 80 and 82 aid in clamping the jaws 16, 18 to a disc shaped lock body. A second drill 84 is shown in a position for extending into the drill guide hole 52 through the guide jaw 16.

Figure 3:
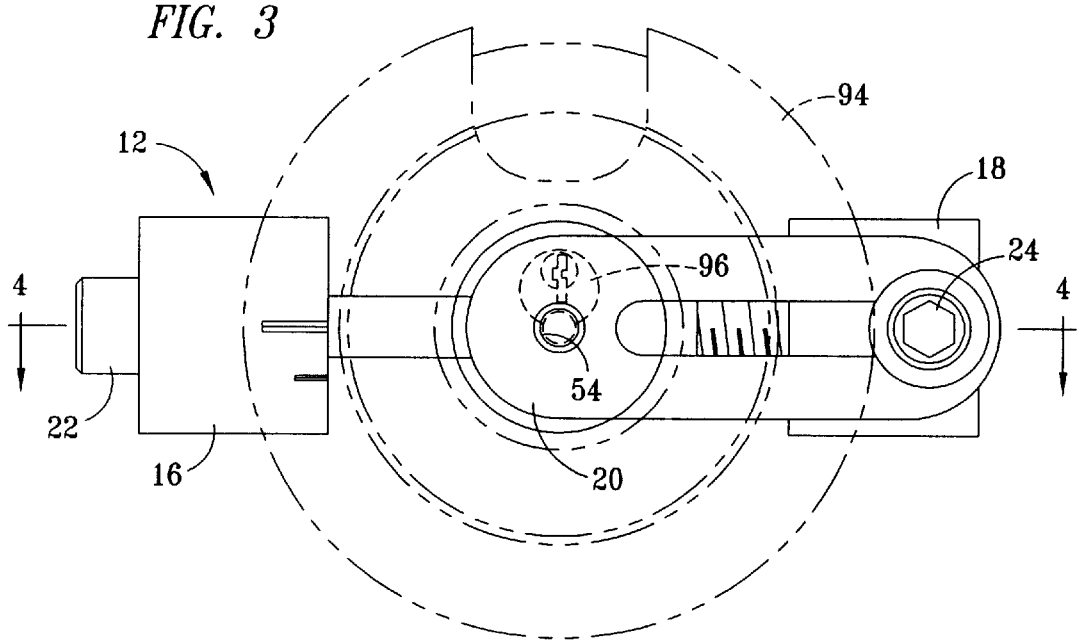
FIG. 3 is a side elevation view of the drill guide fixture mounted to a padlock having a disc-shaped body.
Figure 4:
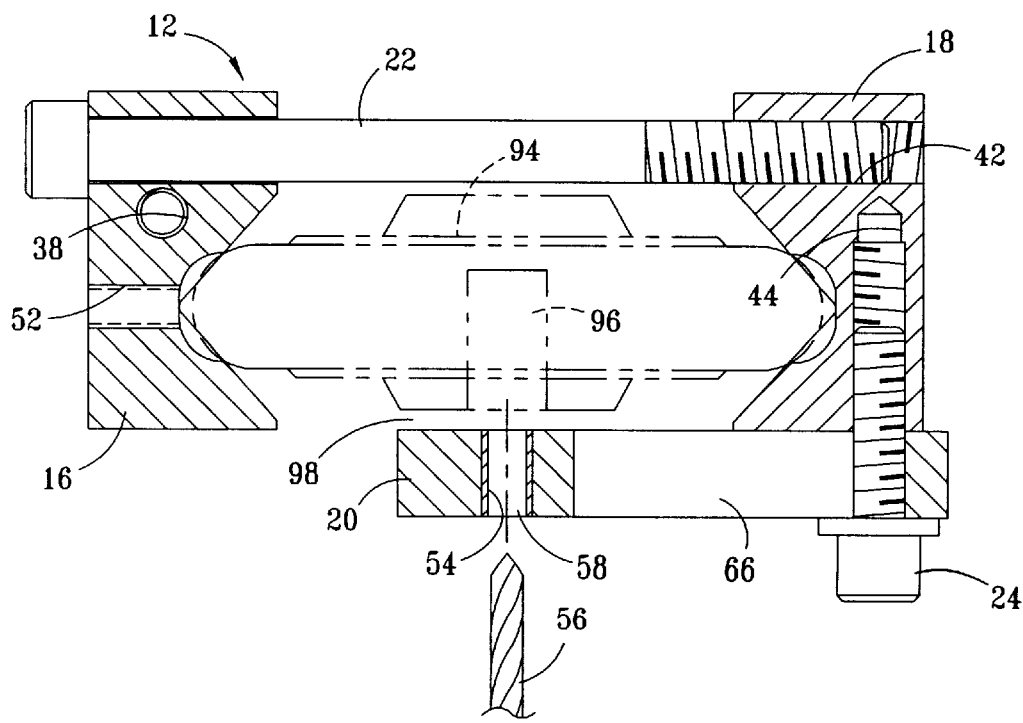
FIG. 4 is a sectional view of the drill guide fixture mounted to the padlock having a disc-shaped body, taken along section line 4—4 of FIG. 3.

FIG. 3 is a side elevation view of the drill guide fixture 12 mounted to a padlock 94 (shown in phantom) having a disc-shaped body, and FIG. 4 is a sectional view of the drill guide fixture 12, taken along 4—4 of FIG. 3. The drill guide fixture 12 has been reconfigured for drilling the pin tumblers of a cylinder 96. The guide arm 20 is now mounted to the latch jaw 18 by securing the guide bolt 24 within the threaded bore 44, which is formed into the latch jaw 18. The drill guide hole 54 is aligned adjacent to the pin tumbler shear line of the cylinder 96, with a gap 98 between the cylinder 96 and the guide arm 20, for drilling the tumbler pins of the cylinder 96. The gap 98 provides a space for cuttings and debris to exit the cylinder 96 during drilling. The gap 98 is preferably one-sixteenth inch to three thirty-seconds of an inch wide. The cylinders 96 on this type of padlock are preferably not replaced, such that the padlock 94 is not reused. After drilling to the bottom of the cylinder 96, the guide arm 20 is moved by loosening the guide bolt 24, and the padlock 94 is opened by inserting a flat blade screwdriver into the key slot of cylinder 96 and turning the flat blade screwdriver clockwise, thus turning the cylinder 96 to open the padlock 94.

Figure 5:
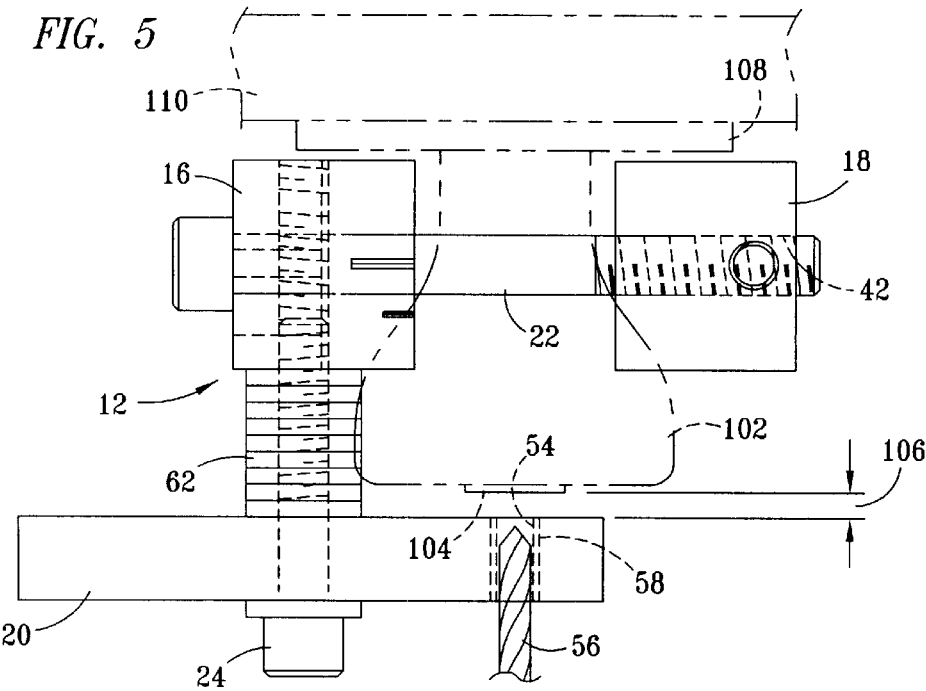
FIG. 5 is a top view of the drill guide fixture mounted to a round door knob mounted on a door.

FIG. 5 is a top view of the drill guide fixture 12 mounted between a round door knob 102 and a door trim plate 108 (shown in phantom). The door trim plate 108 is mounted to a door 110. The washers 62 have been placed between the drill guide arm 20 and the drill guide jaw 16 to space the guide arm 20 apart from the jaw 16 such that a gap 106 is provided between the cylinder 104 and the guide arm 20. The gap 106 is preferably one-sixteenth inch to three thirty-seconds of an inch wide for passing drill cuttings and debris from within the cylinder 104. The guide hole 54 of the guide arm 20 is aligned adjacent to the tumbler pin section of the cylinder 104, such that the drill 56 may be passed through the guide hole 54 for drilling the tumbler pins out of the cylinder 104.

Figure 6:
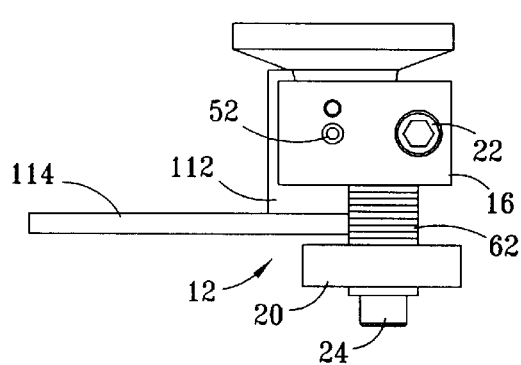
FIG. 6 is a top view of the drill guide fixture mounted to a lever-type lock mounted on a door.
Figure 7:
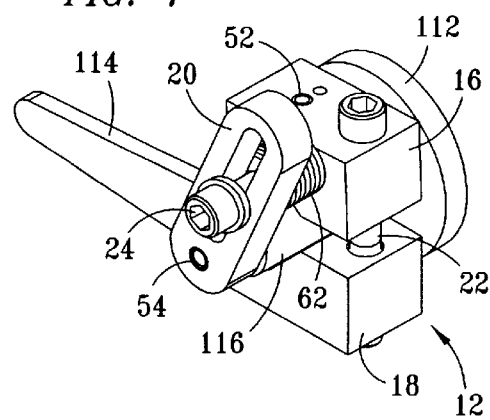
FIG. 7 is a perspective view of the drill guide fixture mounted to the lever-type lock.
Figure 8:
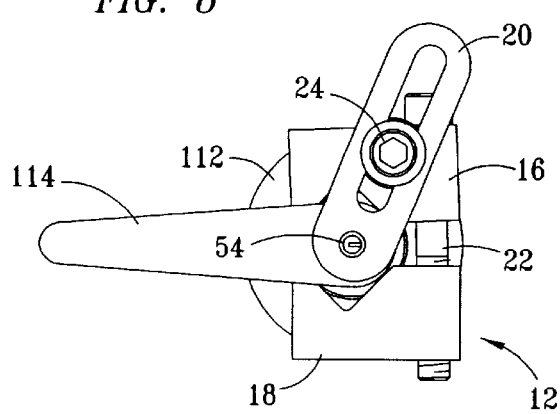
FIG. 8 is a front elevation view of the drill guide fixture mounted to the lever-type lock.
Figure 9:
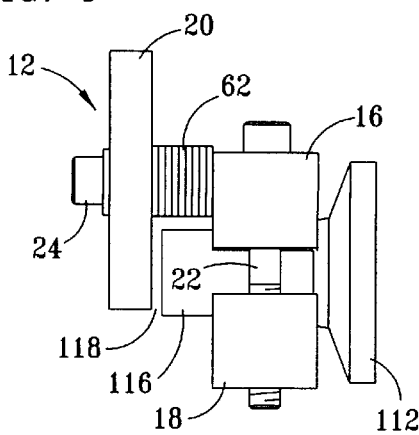
FIG. 9 is a right side elevation view of the drill guide fixture mounted to the lever-type lock.

FIGS. 6 through 9 show the drill guide fixture 12 mounted to a lever-type lock 112 having a lever-handle 114, with FIG. 6 being a top view, FIG. 7 a perspective view, FIG. 8 a front elevation view and FIG. 9 a right-side elevation view. The spacers 62 have been placed between the guide arm 20 and the guide jaw 16 to space apart the guide arm 20 from the cylinder housing 116 of the lock 112, with a gap 118 therebetween. The drill guide hole 54 of the guide arm 20 is aligned with the tumbler pins of the cylinder within the cylinder housing 116, such that the lock tumbler pins may be drilled by passing the drill 56 through the guide hole 54.

Figure 10:
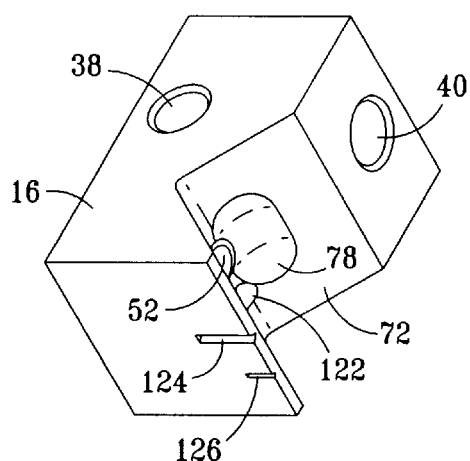
FIG. 10 is a perspective view of the guide jaw.
Figure 11:
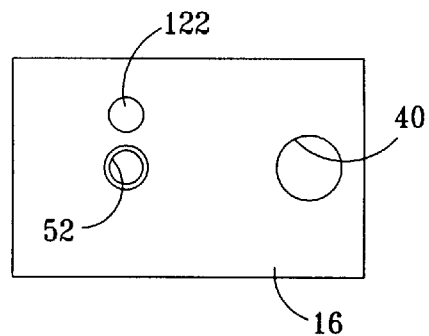
FIG. 11 is a left side view of the guide jaw.
Figure 12:
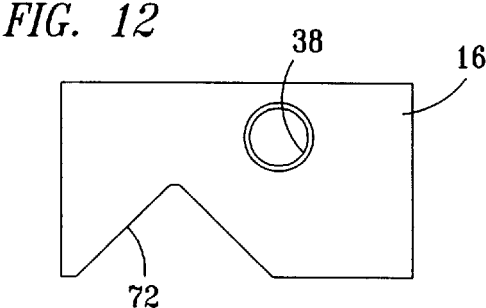
FIG. 12 is a top view of a the guide jaw.
Figure 13:
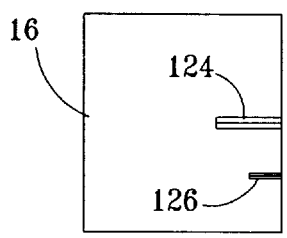
FIG. 13 is a front view of the guide jaw.
Figure 14:
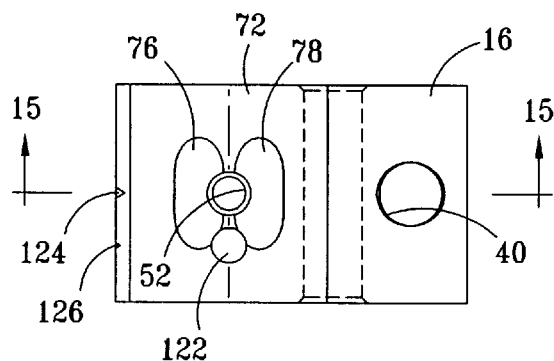
FIG. 14 is a right side view of the guide jaw.
Figure 15:
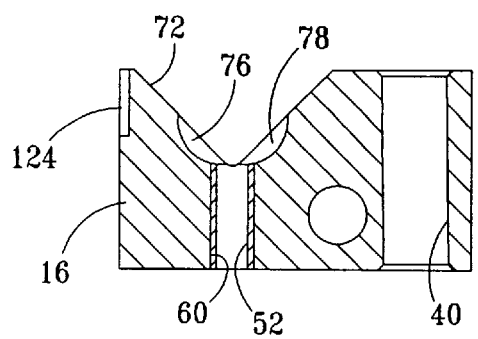
FIG. 15 is a sectional view of the guide jaw, taken along section line 15—15 of FIG. 14.

FIGS. 10 through 15 are various views of the guide jaw 16, with FIG. 10 being a perspective view, FIG. 11 being a left side view, FIG. 12 being a top view, FIG. 13 being a frontal view, FIG. 14 being a right side view, and FIG. 15 being a sectional view taken along section 15—15 of FIG. 14. The guide hole 52 extends parallel to the smooth bore 40. The scalloped recesses 76 and 78 are shown extending into the surfaces of the v-shaped notch 72. The alignment marks 124 and 126 are provided by notches formed to the front of the guide jaws 16. The mark 124 extends parallel to the guide hole 52. The mark 126 extends parallel to a tap guide hole 122. The hardened sleeve 60 is shown extending within the guide hole 52, defining the interior diameter of the guide hole 52. The central, longitudinal axis of the guide hole 52 is perpendicular to and centered with the bend line of the v-shaped notch 72. The guide hole 52 is disposed adjacent to and between the central longitudinal portions of the scalloped recesses 76 and 78.

FIGS. 16 through 19 are various views of the latch jaw 18, with FIG. 16 being a perspective view, FIG. 17 being a left side view, FIG. 18 being a top view, and FIG. 19 being a sectional view. The threaded bores 42 and 44 extend into the latch jaw 18, with the threaded bore 42 transverse to the threaded bore 44. The v-shaped notch 74 is shown extending into the top of the latch jaw 18. Preferably, the v-shaped notch 72 (shown in FIG. 10 for the guide jaw 16) and the v-shaped notch 74 (for the latch jaw 18) each have two planar sides which are at right angles. Two scalloped recesses 80 and 82 are formed into the surfaces of the two planar sides of the v-shaped notch 74, along the bend line of the v-shaped notch 74. The two scalloped-shaped recesses 80 and 82 have elongated profiles.

FIGS. 20 and 21 are a perspective view and a cutaway view, respectively, of the guide arm 20. The body of the guide arm 20 has an elongated shape. The slot 66 also has an elongated shape, having a central longitudinal axis which is concentric with the central longitudinal axis of the guide arm 20. The drill guide hole 54 extends through the guide arm 20, transverse to the slot 66. A hardened sleeve is disposed within the guide hole 54 to provide a bushing 58.

FIGS. 22 through 26 are various views of a padlock 132 having a shackle 134 and a padlock body 136, and show a method for removing a cylinder 138 from within the padlock 132 and then reinstalling the padlock cylinder 138 such that padlock 132 may be opened and used again. The cylinder 138 is secured to the body 136 of the padlock 132 by a screw 140 having a head 142 and a shank 144. The fixture 12 is secured to the padlock 132 as shown in FIGS. 1 and 2, such that the drill 84 may be passed through the body 136 in alignment for defining a drill hole 148 and drilling the shank 144 of the screw 140. The drill hole 148 is disposed at a position which is spaced a distance 152 from the bottom of the padlock 132, and a distance 150 from the side of the padlock 132. The locations of such positions may be defined by distances from edges of the locks which are set forth in tabular form for various types padlocks to define where the drill hole 148 should be located, or positioned, for severing the shank 144 of the screw 140. The notch 124 is used to align guide hole 52 of the jaw guide 16 with a mark placed on the side of the lock at such a position. Additionally, a distance 146 defines the distance of the cylinder 138 from the side-edge of the lock body 136 of the lock 132.

After the shank 144 of the screw 140 is severed, the cylinder 138 is removed and then the padlock 132 is opened with a screwdriver. The padlock 132 may be rekeyed and used again. The cylinder 138 is replaced into the cylinder cavity 156, with a new screw 140 securing the cylinder 138 to the lock body 136. The jaw guide 16 is moved upward to align the tap guide hole 122 with the drill hole 148, and then the drill hole 148 is tapped for receiving a screw 158 with a short shank 160 to seal the drill hole 148. The tap guide hole 122 may be aligned with the drill hole 148 using the alignment notch 126 in the side of the guide jaw 16. Preferably, the drill 84 is a No. 29 size twist drill for drilling the hole 148, and an 8–32 tap is used for tapping the hole 148 for a depth of one-eighth inches. After installation into the tapped drill hole 148, the head of the screw 148 is severed, or ground down, and then polished flat such that the a portion of a shank 160 of the screw 158 of a length of approximately one-eighth inches is left within the hole 148, which may not be removed without drilling. A thread locking adhesive is also preferably used in securing end portion of the shank 160 within the drill hole 148. The lock 132 may then be reused.

Figure 27:
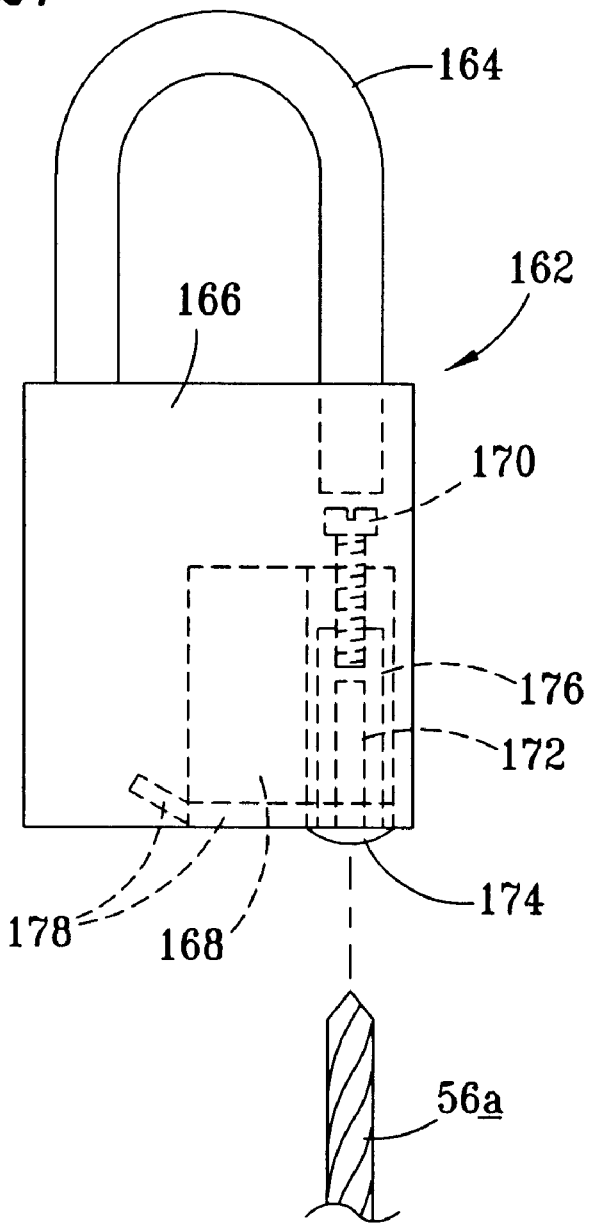
FIG. 27 is an elevation view of a padlock having a lock cylinder which is secured in the body of the padlock with a screw and a barrel nut.
Figure 28:
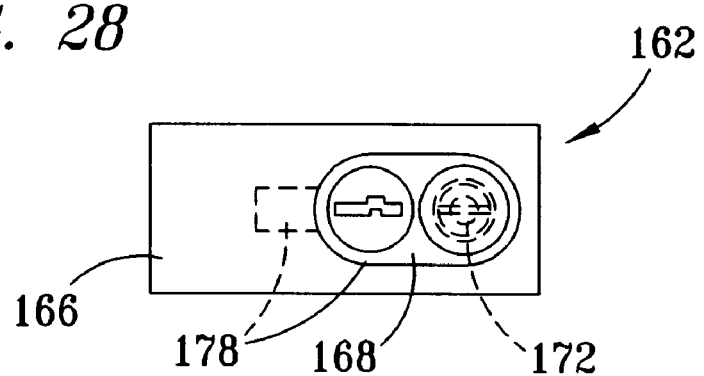
FIG. 28 is bottom view of the padlock having the lock cylinder secured in the padlock body with the screw and the barrel nut.

FIGS. 27 and 28 are a side elevation and a bottom view, respectively, of a padlock 162, and show a method for removing a cylinder 168 from within a body 166 of the padlock 162. The cylinder 168 is held in the body 166 of the padlock 162 by a screw 170 which threadingly engages within a barrel nut fastener 172 to secure the cylinder 168 in the padlock body 166. The barrel nut 172 has a case hardened head 174 and a cylindrically shaped barrel 176. The cylindrically shaped barrel 176 has internal threads for threadingly securing to the screw 170. The portion of the head 174 which is adjacent the cylindrical barrel 176 has a periphery which is of a square shape for fitting within a rectangular hole formed into a plate 178, such that the barrel nut 172 cannot be turned when the screw 170 secures the fastener fully within the body 166 of the padlock 162. The head 174 preferably has a hard exterior surface and the plate 178 is also formed of a hard metal to prevent drilling. However, for most locks of this type, the head 174 of the barrel nut 172 is not sufficiently hard to prevent drilling with a tungsten carbide drill, which may be used for the drill 56. The head 174 of the barrel nut 172 may also be ground through the exterior hard facing with a powered rotary tool, and then drilled with std. twist drill.

The drill guide fixture 12 is secured to the padlock 162 by clamping the guide jaw 16 and the latch jaw 18 on opposite sides of the padlock 162 as shown in FIGS. 1 and 2, with the guide arm 20 mounted to the guide jaw 16 such that the bushing 58 of the guide hole 54 is aligned adjacent to the head 174 of the barrel nut fastener 172. The drill 56 is then passed through the bushing 58 to cut the head 174 off of the barrel nut 172 until the plate 178 is free. The plate 178 and the cylinder 168 are then removed from the padlock body 166, and then the cylinder 168 re-keyed and reinstalled into the padlock 162 with a new barrel nut 172. In the alternative, the padlock 162 may be drilled as shown in FIGS. 22 through 25 to sever the screw 170, in which case a new screw 170 will be required to reuse the padlock 164.

Figure 29:
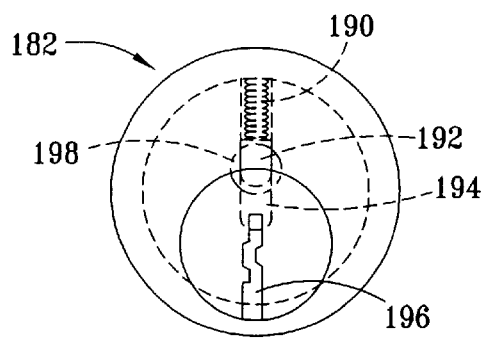
FIG. 29 is a front elevation view of a lock cylinder.
Figure 30:
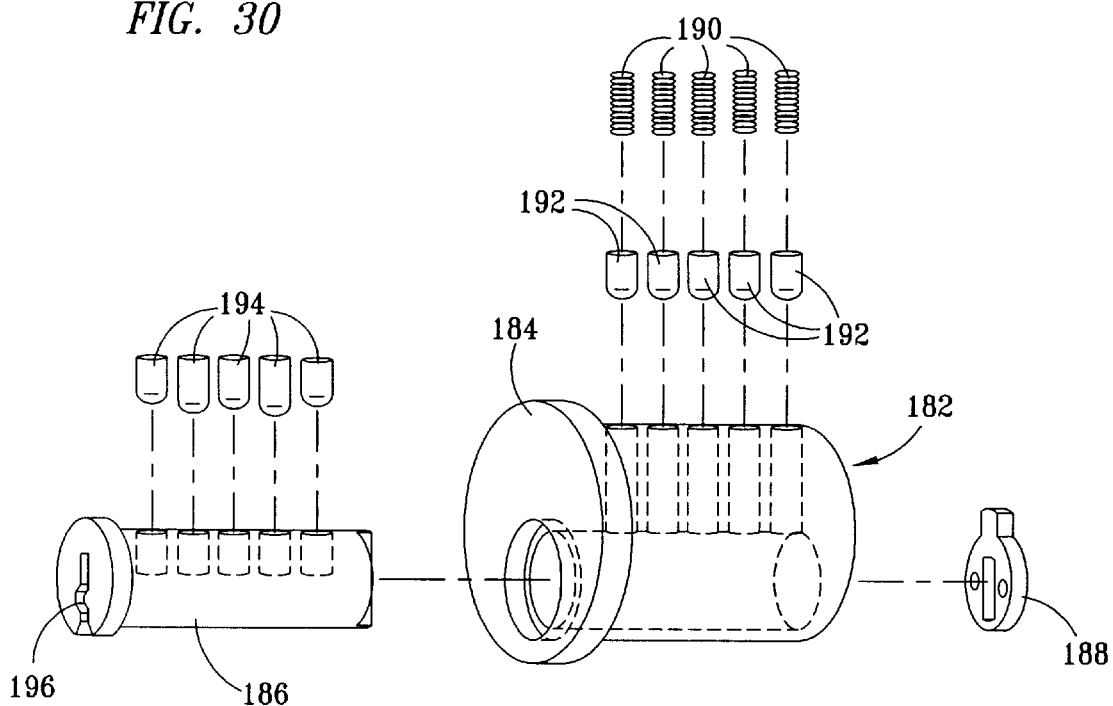
FIG. 30 is an exploded view of the lock cylinder.
Figure 31:
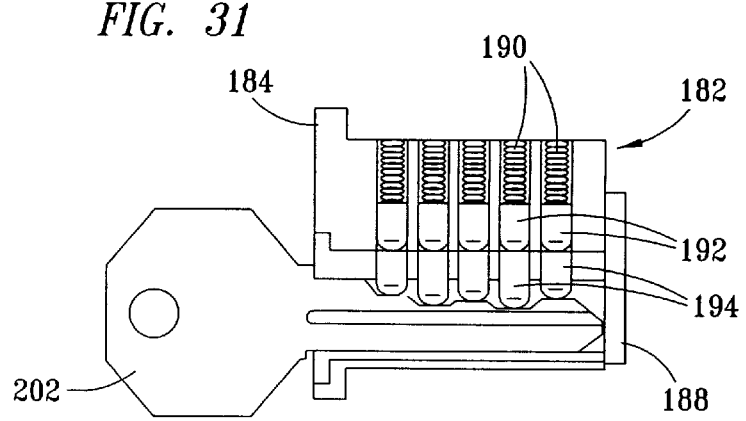
FIG. 31 is a sectional view of the lock cylinder.

FIGS. 29 through 31 show various stages of a method for drilling a lock cylinder 182, with FIG. 29 being a front elevation view, FIG. 30 being an exploded view, and FIG. 31 being a sectional view. In FIG. 29, top and bottom tumbler pins 192, 194 are drilled along the shear line of the lock cylinder 182 by forming a drill hole 198 above the keyhole 196 into the shell 184 and the plug 186 of the cylinder 182. Preferably, the steps of drilling the tumbler pins 192, 194 and cleaning the drill hole 198 are repeated several times until the plug 86 may be turned in the shell 184. Then, as shown in FIG. 30, a new cylinder 182 is provided, with a new shell 184 and a new plug 186. New bottom tumbler pins 194 are placed in the plug 186 and the plug 186 is installed into the shell 184. Either the bottom tumbler pins 194 are selectively sized for use with a key 202, or the height of the teeth of the key 202 are sized such that the top of the tumbler pins are flush with the shear line between the plug 186 and the shell 184. Once the plug 186 is installed within the shell 184, the cam 188 is secured to the plug 186 to secure the plug 186 within the shell 184. The top tumbler pins 192 and the tumbler springs 192 are then installed into the shell 184, and the entire cylinder assembly 182 is reinstalled into a lock. FIG. 31 shows the bottom tumbler pins 194 as having been selected of various lengths for use with the profile of a key 202, to dispose the interface between the top pins 192 and the bottom pins 194 at the shear line between the shell 184 and the plug 186 of the cylinder 182.

The drill guide fixture of the present invention provides several advantages over the prior art. The drill guide fixture is adaptable for use on many types, shapes and sizes of locks, including disc shaped padlocks, rectangular padlocks, round door knobs and lever type door locks. The drill guide fixture has two jaws, one being a guide jaw and the other being a latch jaw, which are secured together with a bolt to clamp the same drill guide fixture onto different types, shapes and sizes of locks and door knobs. The guide arm has a longitudinally extending slot which allows positioning of a drill guide hole relative to a lock cylinder for drilling the lock, to open the lock. The drill guide hole has a hardened guide bushing. The guide jaw also includes a drill guide hole and drill guide bushing, in addition to a tap guide hole. The tap guide hole may be used for threading a hole which is drilled into the side of a lock body, such that a screw maybe used to seal the drill hole in the side of the lock body in conditioning the lock for reuse.

Although the preferred embodiment has been described in detail, it should be understood that various changes, substitutions and alterations can be made therein without departing from the spirit and scope of the invention as defined by the appended claims.

What is claimed is:

1. A drill guide fixture for drilling a lock to open the lock, comprising:
   a guide arm having an elongated body, a slot extending longitudinally in relation to said elongated body, and a first drill guide hole extending transverse to said slot and said elongated body;
   a guide jaw;
   a latch jaw;
   a latch bolt for securing said guide jaw to said latch jaw with a selectable spacing therebetween; and
   a guide bolt for securing said guide arm to one of said guide jaw and said latch jaw, with a selectable distance therebetween.

2. The drill guide fixture of claim 1, further comprising a second drill guide hole extending through said guide jaw.

3. The drill guide fixture of claim 2, further comprising said guide jaw having a first v-shaped notch formed therein, and said latch jaw having a second v-shaped notch formed therein.

4. The drill guide fixture of claim 3, further comprising two scalloped-shaped recesses formed in each of said v-shaped notches of said guide jaw and said latch jaw.

5. The drill guide fixture of claim 4, wherein said second guide hole formed to extend through said guide jaw is disposed along a bend line of said first v-shaped notch of said guide jaw, adjacent to central portions of each of said scalloped-shaped recesses formed into said surfaces of first said v-shaped notch of said guide jaw.

6. The drill guide fixture of claim 5, further comprising first and second hardened sleeves pressed into each of said first and second drill guide holes.

7. The drill guide fixture of claim 6, further comprising a mark formed onto a side of said guide jaw to extend parallel to said second drill guide hole for aligning said second drill guide hole with a predefined position relative to the lock.

8. The drill guide fixture of claim 7, further comprising a tap guide hole formed to extend through said guide jaw, spaced apart from and parallel to said second drill guide hole.

9. The drill guide fixture of claim 8, further comprising a second mark formed onto said side of said guide jaw to extend parallel to said tap guide hole for aligning said tap guide hole with the lock.

10. The drill guide fixture of claim 9, wherein said mark for said second drill guide hole and said second mark for said tap guide hole are defined by notches formed into said side of said guide jaw.

11. A drill guide fixture for drilling a lock to open the lock, comprising:
    a guide arm having an elongated body, a slot extending longitudinally in relation to said elongated body, and a first drill guide hole extending transverse to said slot and said elongated body;
    a guide jaw having a first notch formed therein, and second drill guide hole extending therethrough;
    a latch jaw having a second notch formed therein;
    a latch bolt for securing said guide jaw to said latch jaw with a selectable spacing therebetween; and
    a guide bolt for securing said guide arm to one of said guide jaw and said latch jaw, with a selectable distance therebetween.

12. The drill guide fixture of claim 11, further comprising two scalloped-shaped recesses formed into each of said first and second notches of said guide jaw and said latch jaw, respectively.

13. The drill guide fixture of claim 11, further comprising first and second hardened sleeves pressed into each of said first and second drill guide holes.

14. The drill guide fixture of claim 11, further comprising a mark formed onto a side of said guide jaw to extend parallel to said second drill guide hole for aligning said second drill guide hole with a predefined position relative to the lock.

15. The drill guide fixture of claim 14, wherein said mark for said second drill guide hole is defined by a notch formed into said side of said guide jaw.

16. The drill guide fixture of claim 11, further comprising a tap guide hole formed to extend through said guide jaw, spaced apart from and parallel to said second drill guide hole.

17. The drill guide fixture of claim 16, further comprising a mark formed onto a side of said guide jaw to extend parallel to said tap guide hole for aligning said tap guide hole with the lock.

18. The drill guide fixture of claim 17, wherein said mark for said tap guide hole is defined by a notch formed into said side of said guide jaw.

19. A drill guide fixture for drilling a lock to open the lock, comprising:
    a guide arm having an elongated body, a slot extending longitudinally in relation to said elongated body, and a first drill guide hole extending transverse to said slot and said elongated body;
    a guide jaw having a first notched formed therein, a second drill guide hole and a tap guide hole extending through said guide jaw, with said tap guide hole spaced apart from and parallel to said second drill guide hole;
    a latch jaw having a second notch formed therein;
    a latch bolt for securing said guide jaw to said latch jaw with a selectable spacing therebetween;
    a guide bolt for securing said guide arm to one of said guide jaw and said latch jaw, with a selectable distance therebetween;
    first and second hardened sleeves pressed into each of said first and second drill guide holes; and
    two scalloped-shaped recesses formed in each of said notches of said guide jaw and said latch jaw.

20. The drill guide fixture of claim 19, wherein said scalloped-shaped recesses are centered in respective ones of said notches of said guide jaw and said latch jaw.

* * * * *